(12) United States Patent
Zhao et al.

(10) Patent No.: US 11,386,702 B2
(45) Date of Patent: Jul. 12, 2022

(54) RECOGNITION APPARATUS AND METHOD

(71) Applicant: CANON KABUSHIKI KAISHA, Tokyo (JP)

(72) Inventors: Xudong Zhao, Beijing (CN); Yaohai Huang, Beijing (CN); Chunlei Wu, Beijing (CN)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/141,124

(22) Filed: Sep. 25, 2018

(65) Prior Publication Data
US 2019/0102609 A1 Apr. 4, 2019

(30) Foreign Application Priority Data
Sep. 30, 2017 (CN) .......................... 201710914591.7

(51) Int. Cl.
*G06K 9/00* (2022.01)
*G06K 9/62* (2022.01)
*G06V 40/16* (2022.01)
*G06V 40/10* (2022.01)

(52) U.S. Cl.
CPC .......... *G06V 40/172* (2022.01); *G06K 9/6268* (2013.01); *G06V 40/10* (2022.01); *G06V 40/168* (2022.01); *G06V 40/178* (2022.01)

(58) Field of Classification Search
CPC .......... G06K 9/00268; G06K 9/00288; G06K 9/00295; G06K 9/6292; G06K 9/6268; G06K 2009/00322; G06K 9/00302; G06K 9/00362
See application file for complete search history.

(56) References Cited

U.S. PATENT DOCUMENTS

| | | | |
|---|---|---|---|
| 9,002,116 B2 | 4/2015 | Lin et al. | |
| 2007/0237387 A1* | 10/2007 | Avidan | G06K 9/4647 382/159 |
| 2011/0222724 A1* | 9/2011 | Yang | G06K 9/4628 382/103 |
| 2013/0254143 A1* | 9/2013 | Ueki | G06N 7/005 706/12 |
| 2014/0140625 A1* | 5/2014 | Zhang | G06K 9/00677 382/195 |
| 2014/0247992 A1* | 9/2014 | Lin | G06K 9/6202 382/195 |
| 2015/0131873 A1* | 5/2015 | Brandt | G06K 9/00268 382/118 |

(Continued)

OTHER PUBLICATIONS

Jiayan Qiu, "Convolutional Neural Network based Age Estimation from Facial Image and Depth Prediction from Single Image", Thesis, Australian National University, Jan. 2016 (Year: 2016).*

(Continued)

*Primary Examiner* — Aristocratis Fotakis
(74) *Attorney, Agent, or Firm* — Canon U.S.A., Inc. IP Division

(57) ABSTRACT

A recognition apparatus for extracting first features of an object from a region of the object; obtaining second features of the object at least based on confidence information for first attribute of the object; determining sample information from pre-determined sample information based on the obtained second features; and recognizing the first attribute of the object based on the determined sample information.

10 Claims, 7 Drawing Sheets

(56) References Cited

U.S. PATENT DOCUMENTS

| | | | | |
|---|---|---|---|---|
| 2015/0139485 A1* | 5/2015 | Bourdev | .............. | G06K 9/6292 |
| | | | | 382/103 |
| 2016/0148080 A1* | 5/2016 | Yoo | .................... | G06K 9/00281 |
| | | | | 382/157 |
| 2018/0089543 A1* | 3/2018 | Merler | ................. | G06K 9/6268 |
| 2018/0121748 A1* | 5/2018 | Kwak | ....................... | G06N 3/08 |
| 2020/0012880 A1* | 1/2020 | Yao | ...................... | G06K 9/4642 |
| 2020/0012887 A1* | 1/2020 | Li | ....................... | G06K 9/00228 |
| 2020/0019759 A1* | 1/2020 | Savchenko | ........... | G06N 3/0454 |
| 2020/0065324 A1* | 2/2020 | Watanabe | ............. | G06F 16/583 |
| 2020/0134294 A1* | 4/2020 | Liang | ................. | G06K 9/00268 |
| 2020/0320769 A1* | 10/2020 | Chen | .................... | G06F 16/538 |
| 2021/0224594 A1* | 7/2021 | Odaibo | ................ | G06K 9/6256 |

OTHER PUBLICATIONS

N. Bellustin and Y. Kalafati, "Instant Human Face Attributes Recognition System", (IJACSA) International Journal of Advanced Computer Science and Applications, Special Issue on Artificial Intelligence (Year: 2011).*

Rasmus Rothe, Radu Timofte and Luc Van Gool, "Deep expectation of real and apparent age from a single image without facial landmarks", Zurich, Jul. 20, 2006 (Year: 2006).*

* cited by examiner

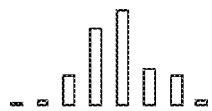 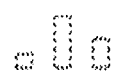 
Fig. 1A  Fig. 1B  Fig. 1C
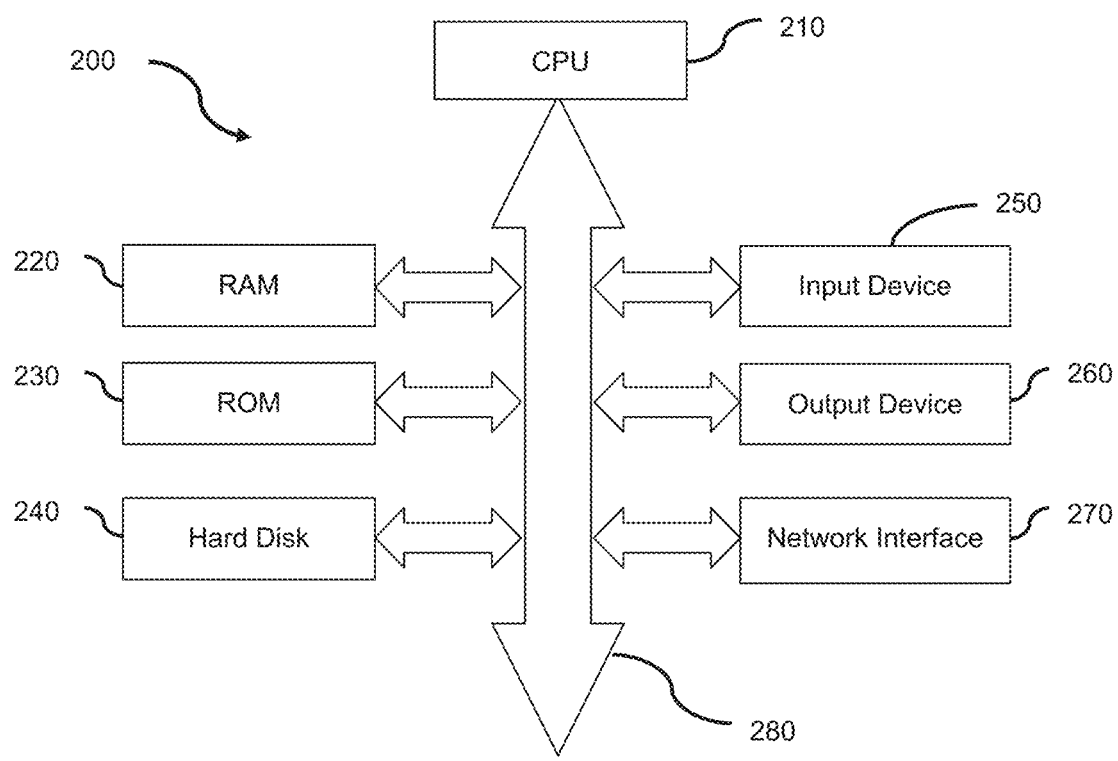
Fig. 2

GT age: 39

GT age: 39

GT age: 39
GT race: Asian

RECOGNITION APPARATUS AND METHOD

CROSS REFERENCE TO RELATED APPLICATIONS

This application claims the benefit of Chinese patent application no. 201710914591.7, filed Sep. 30, 2017, which is hereby incorporated by reference herein in its entirety.

BACKGROUND OF THE INVENTION

Field of the Invention

The present invention relates to image processing, especially relates to a recognition apparatus and a recognition method.

Description of the Related Art

Since human attributes commonly refer to facial appearances and/or body appearances that could depict a person, human attribute recognition is generally used for human behaviour analysis (e.g. people attribute counting, people tracking, crowd analysis). Wherein, the facial appearances comprise the person's age, the person's gender, and the person's race for example. The body appearances comprise body height of the person and body weight of the person for example.

One exemplary human attribute recognition technique is disclosed in U.S. Pat. No. 9,002,116B2 which mainly comprises: firstly finding similar images (e.g. the ranked top N images) which have similar facial appearances to a person in an inputted image from a storage device according to feature matching, and then estimating the facial attribute (e.g. the age) of the person in the inputted image based on the facial attributes (e.g. the ages) of the persons in the similar images.

That is to say, the above-mentioned human attribute recognition technique recognizes the attribute of a person in an inputted image by finding similar images from a storage device. Therefore, in case few similar images could be found from the storage device, that is, in case the feature space which contains the features of the inputted image is sparse (i.e. a space used to find the similar images is sparse), some dissimilar images will be introduced to use for recognizing the attribute of the person. Especially, since the dimensionality of the features (e.g. Histogram of Oriented Gradient (HOG) features, Local Binary Pattern (LBP) features) which are used for feature matching is high, the feature space which contains the features of the inputted image will become sparser, thus, fewer similar images could be found from the storage device, which will cause more dissimilar images to be introduced to use for recognizing the attribute of the person. Therefore, the accuracy of the similar images will be affected, which will affect the accuracy of the human attribute recognition.

SUMMARY OF THE INVENTION

Therefore, in view of the above recitations in Description of the Related Art, the present disclosure aims to solve at least one point of the issues described above.

According to one aspect of the present disclosure, there is provided a recognition apparatus, comprising: a feature extraction unit configured to extract first features of an object from a region of the object which is obtained from an image; a feature obtainment unit configured to obtain second features of the object at least based on confidence information for first attribute of the object, wherein the confidence information for the first attribute of the object is obtained based on a classifier corresponding to the first attribute and the first features extracted by the feature extraction unit; a sample information determination unit configured to determine sample information from pre-determined sample information based on the second features obtained by the feature obtainment unit; and an attribute recognition unit configured to recognize the first attribute of the object based on the sample information determined by the sample information determination unit.

Wherein, the pre-determined sample information at least comprise labeled first attributes (i.e. Ground Truth (GT) first attributes) and features which are obtained at least based on confidence information for the labeled first attributes.

Wherein, the object is human and the attributes of the object are facial attributes of the human or body attributes of the human. Wherein, the facial attributes of the human are age, gender, race, hair type (e.g. wavy hair, straight hair), hair length (e.g. long hair, short hair), and/or hair color for example. Wherein, the body attributes of the human are body height, body weight, clothes type, clothes pattern, and/or clothes color for example.

Taking advantage of the present disclosure, the accuracy and the speed of the attribute recognition (especially the human attribute recognition) will be improved.

Further characteristic features and advantages of the present disclosure will be apparent from the following description with reference to the drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A to 1C schematically shows exemplary confidence information for human attributes according to the present invention.

FIG. 2 is a block diagram schematically showing the hardware configuration that can implement the techniques according to the embodiments of the present invention.

DESCRIPTION OF THE EMBODIMENTS

Figure 3:
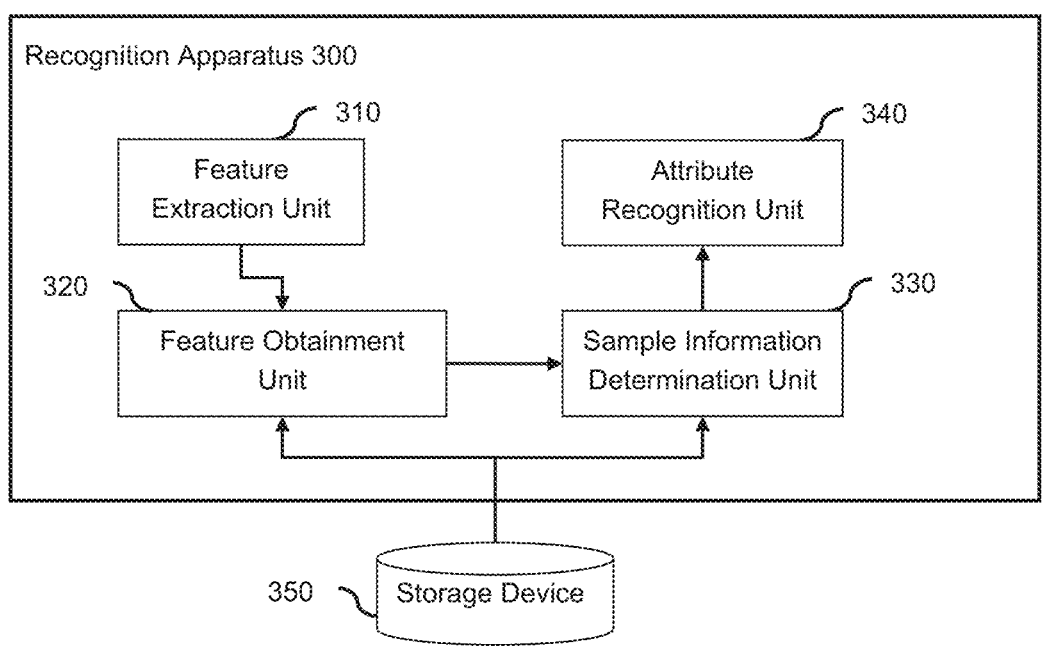
FIG. 3 is a block diagram illustrating the configuration of a recognition apparatus according to the first embodiment of the present invention.

Exemplary embodiments of the present invention will be described in detail with reference to the drawings below. It shall be noted that the following description is merely illustrative and exemplary in nature, and is in no way intended to limit the present invention and its applications or uses. The relative arrangement of components and steps, numerical expressions and numerical values set forth in the embodiments do not limit the scope of the present invention unless it is otherwise specifically stated. In addition, techniques, methods and devices known by persons skilled in the art may not be discussed in detail, but are intended to be apart of the specification where appropriate.

Please note that similar reference numerals and letters refer to similar items in the figures, and thus once an item is defined in one figure, it need not be discussed for following figures.

It can be seen from the above-mentioned human attribute recognition technique in the art that the similar images are used as references to recognize the human attribute and the accuracy of the references directly affects the accuracy of the human attribute recognition, wherein the accuracy of the references depends on the sparsity of the space that is used to obtain the references. Therefore, in order to make the space used to obtain the references much denser, so that the more accurate references could be obtained, instead of finding the similar images by using the feature matching as described in the prior art, the present disclosure takes the following two aspects into consideration:

1) As for one attribute (e.g. one attribute of human, one attribute of a bag, etc.), objects (e.g. human, bags, etc.) with the similar attribute will have similar confidence information for this attribute. Wherein, the attribute of human (i.e. the human attribute) is the age of the human, the gender of the human or the race of the human for example. Wherein, the attribute of a bag is the color of the bag, the pattern of the bag or the size of the bag for example.

2) Confidence information for one attribute of an object could reflect probability information that is obtained by classifying this object relative to this attribute, which makes one confidence information could be used to represent one higher concept information (e.g. one attribute of an object) and makes the dimensionality of features which are obtained based on the confidence information is much lower than the dimensionality of the above-mentioned features which are used for feature matching. For example, assuming that the object is human, the exemplary confidence information for the age of the human is shown in FIG. 1A, wherein each bar with the solid line represents the corresponding probability that the human belongs to one value of the age (e.g. 33 years old). The exemplary confidence information for the race of the human is shown in FIG. 1B, wherein each bar with the dash dot lines represents the corresponding probability that the human belongs to one value of the race (e.g. yellow race). And the exemplary confidence information for the gender of the human is shown in FIG. 1C, wherein each bar with the broken lines represents the corresponding probability that the human belongs to one value of the gender (e.g. man).

Therefore, the inventor found that, in case the confidence information for the attribute of the object in the inputted image could be used to determine the references which are used to recognize the attribute of the object from pre-stored samples, and in case the pre-stored samples could be represented by features which are obtained based on the corresponding confidence information, in one aspect, as long as the pre-stored samples have the features which are obtained based on the similar confidence information and no matter whether the pre-stored samples have the similar appearances to the object or not, the corresponding pre-stored samples could be determined as the references. This will make that much more references could be determined to recognize the attribute of the object. In the other aspect, since the dimensionality of the features which are obtained based on the confidence information is much lower, the space which is used to determine the references will become much denser, which will make that more accurate references could be determined to recognize the attribute of the object. Wherein, at present disclosure, the pre-stored samples are regarded as pre-determined sample information and at least comprise GT attributes (e.g. GT ages) and features which are obtained at least based on confidence information for the GT attributes. Furthermore, as a preferable and optional solution, the GT attributes and the corresponding features in the pre-determined sample information are stored in the form of pairs.

Therefore, by using the references which are determined according to the present disclosure, the accuracy of the attribute recognition could be improved. Furthermore, since the references are determined from the above-mentioned pre-determined sample information, the speed of the attribute recognition according to the present disclosure will increase. In addition, since the dimensionality of the features which are obtained based on the confidence information is much lower, the speed of the attribute recognition according to the present disclosure will increase.

(Hardware Configuration)

The hardware configuration that can implement the techniques described hereinafter will be described first with reference to FIG. 2.

The hardware configuration 200, for example, includes Central Processing Unit (CPU) 210, Random Access Memory (RAM) 220, Read Only Memory (ROM) 230, Hard Disk 240, Input Device 250, Output Device 260, Network Interface 270 and System Bus 280. Further, the hardware configuration 200 could be implemented by, such as cameras, personal data assistants (PDAs), mobile phones, tablet computers, laptops, desktops or other suitable electronic device.

Figure 11:
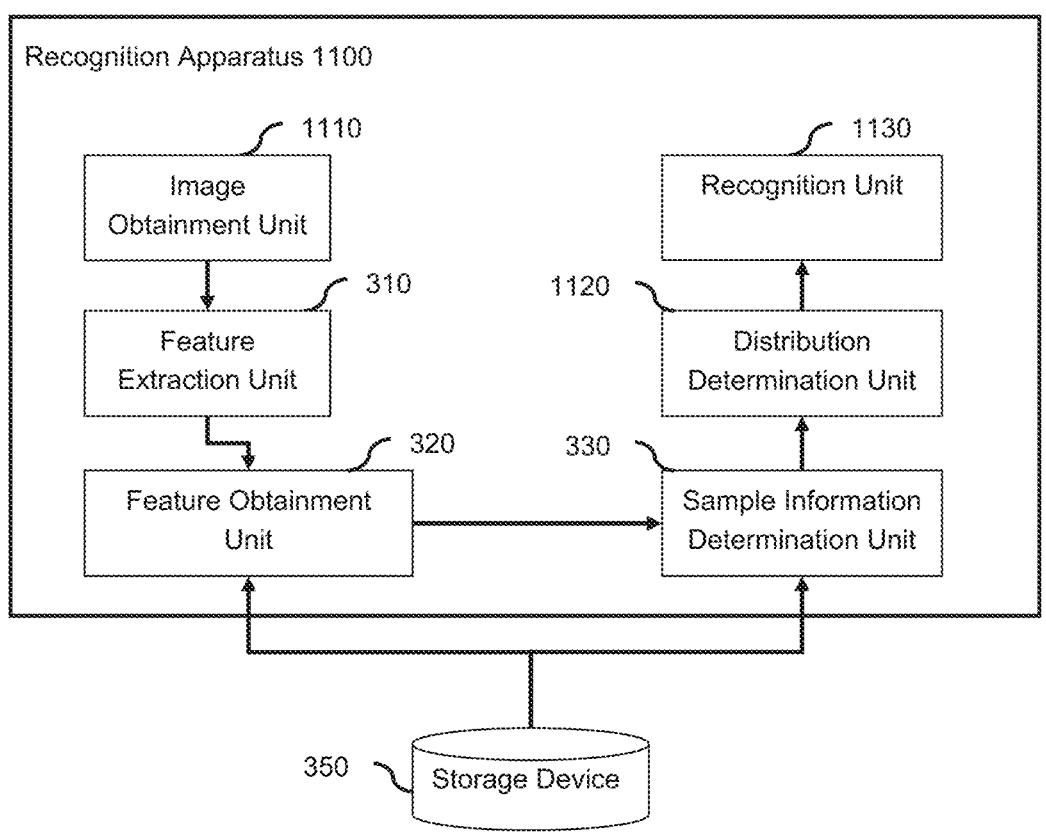
FIG. 11 is a block diagram illustrating the configuration of a recognition apparatus according to the third embodiment of the present invention.

In a first implementation, the recognition processing according to the present disclosure is configured by hardware or firmware and is acted as a module or component of the hardware configuration 200. For example, the recognition apparatus 300 which will be described in detail hereinafter with reference to FIG. 3 or the recognition apparatus 800 which will be described in detail hereinafter with reference to FIG. 8 or the recognition apparatus 1100 which will be described in detail hereinafter with reference to FIG. 11 is acted as a module or component of the hardware configuration 200. In a second implementation, the recognition processing according to the present disclosure is configured by software, stored in the ROM 230 or the Hard Disk 240, and executed by the CPU 210. For example, the procedure 400 which will be described in detail hereinafter with reference to FIG. 4 or the procedure 420 which will be described in detail hereinafter with reference to FIG. 6 may function as a program stored in the ROM 230 or the Hard Disk 240.

The CPU 210 is any suitable programmable control devices (such as processors) and could execute a variety of functions, to be described hereinafter, by executing a variety of application programs that are stored in the ROM 230 or the Hard Disk 240 (such as memories). The RAM 220 is used to temporarily store the program or the data that are loaded from the ROM 230 or the Hard Disk 240, and is also used as a space wherein the CPU 210 executes the variety of procedures, such as carrying out the techniques which will be described in detail hereinafter with reference to FIG. 4 or FIG. 6, as well as other available functions. The Hard Disk 240 stores many kinds of information, such as an operating system (OS), the various applications, a control program, the pre-determined sample information as described above, classifiers, and/or, pre-defined data (e.g. Thresholds (THs)).

In one implementation, the Input Device 250 is used to allow the user to interact with the hardware configuration 200. In one instance, the user could input images/videos/data through the Input Device 250. In another instance, the user could trigger the corresponding processing of the present disclosure through the Input Device 250. Furthermore, the Input Device 250 can take a variety of forms, such as a button, a keypad or a touch screen. In another implementation, the Input Device 250 is used to receive images/videos which are output from special electronic devices, such as digital cameras, video cameras and/or network cameras.

In one implementation, the Output Device 260 is used to display the recognition results (such as the human attributes) to the user. And the Output Device 260 can take a variety of forms, such as a Cathode Ray Tube (CRT) or a liquid crystal display. In another implementation, the Output Device 260 is used to output the recognition results to the subsequent processing, such as human behaviour analysis (e.g. people attribute counting, people tracking, crowed analysis), face identification, human image search, and so on.

The Network Interface 270 provides an interface for connecting the hardware configuration 200 to the network. For example, the hardware configuration 200 could perform, via the Network Interface 270, data communication with other electronic devices connected via the network. Alternatively, a wireless interface may be provided for the hardware configuration 200 to perform wireless data communication. The system bus 280 may provide a data transfer path for transferring data to, from, or between the CPU 210, the RAM 220, the ROM 230, the Hard Disk 240, the Input Device 250, the Output Device 260 and the Network Interface 270, and the like to each other. Although referred to as a bus, the system bus 280 is not limited to any specific data transfer technology.

The above described hardware configuration 200 is merely illustrative and is in no way intended to limit the invention, its application, or uses. And for the sake of simplicity, only one hardware configuration is shown in FIG. 2. However, a plurality of hardware configurations can also be used as needed.

(Recognition Processing)

The recognition processing (especially, the attribute recognition) according to the present disclosure will be described next with reference to FIG. 3 to FIG. 12C.

FIG. 3 is a block diagram illustrating the configuration of the recognition apparatus 300 according to the first embodiment of the present disclosure. Wherein, some or all of the blocks shown in FIG. 3 could be implemented by dedicated hardware. As shown in FIG. 3, the recognition apparatus 300 comprises a feature extraction unit 310, a feature obtainment unit 320, a sample information determination unit 330 and an attribute recognition unit 340.

In addition, a storage device 350 shown in FIG. 3 stores the corresponding classifiers which will be used by the feature obtainment unit 320 and the above-mentioned pre-determined sample information. Alternatively, the corresponding classifiers and the above-mentioned pre-determined sample information could be stored in different storage devices. In one implementation, the storage device 350 is the ROM 230 or the Hard Disk 240 shown in FIG. 2. In another implementation, the storage device 350 is a server or an external storage device which is connected with the recognition apparatus 300 via the network (not shown).

At this embodiment, recognizing the age of a person (e.g. first attribute of the person) in an inputted image will be taken as an example. However, it is readily apparent that it is not necessarily limited thereto. First, the Input Device 250 shown in FIG. 2 receives an image which is output from the special electronic device (e.g. the camera) or is input by the user. Second, the Input Device 250 transfers the received image to the recognition apparatus 300 via the system bus 280.

And then as shown in FIG. 3, the feature extraction unit 310 extracts first features of the person from a region of the person (e.g. a face region) which is obtained from the received image.

The feature obtainment unit 320 obtains second features of the person at least based on confidence information for the age of the person. Wherein, the confidence information for the age of the person is obtained based on the first features extracted by the feature extraction unit 310 and a first classifier which is used for classifying the age and is stored in the storage device 350.

The sample information determination unit 330 determines sample information from the pre-determined sample information stored in the storage device 350 based on the second features obtained by the feature obtainment unit 320.

And then, the attribute recognition unit 340 recognizes the age of the person in the received image based on the sample information determined by the sample information determination unit 330.

Finally, after the attribute recognition unit 340 recognizes the age of the person in the received image, the attribute recognition unit 340 transfers the age of the person to the Output Device 260 shown in FIG. 2 via the system bus 280 for displaying the age of the person to the user or for the subsequent processing, such as face identification, human image search, and so on.

Figure 4:
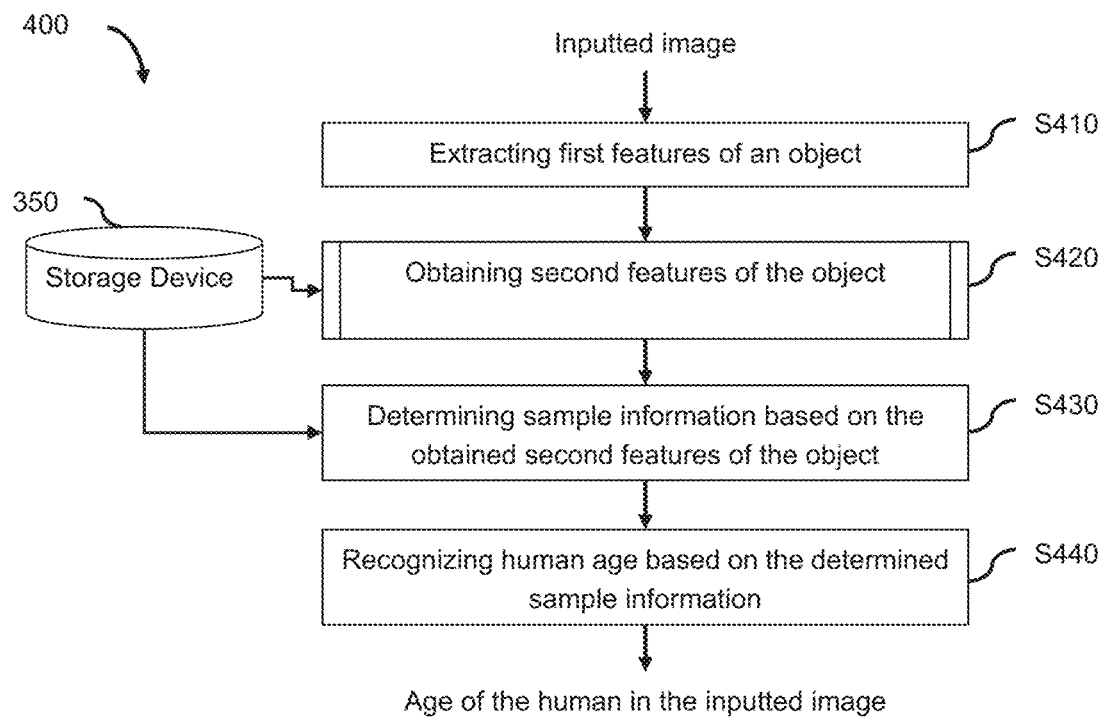
FIG. 4 schematically shows a flowchart of the recognition processing according to the first embodiment of the present invention.

The flowchart 400 shown in FIG. 4 is the corresponding procedure of the recognition apparatus 300 shown in FIG. 3.

As shown in FIG. 4, in feature extraction step S410, the feature extraction unit 310 firstly determines a face region of the person from the received image by using a face alignment method for example. And then, the feature extraction unit 310 extracts first features of the person from the determined face region, wherein the extracted first features are HOG features or LBP features for example. Alternatively, in order to recognize the more accurate age of the person, the feature extraction unit 310 extracts the first features of the person according to Convolutional Neural Network (CNN). In addition, it can be seen that, in case the human attribute to be recognized is not the facial attributes of the person (e.g. the age of the person) but the body attributes of the person (e.g. the body height of the person), a body region of the person could be determined from the received image for the subsequent processing by using a body detection method for example.

In feature obtainment step S420, the feature obtainment unit 320 obtains second features of the person at least based on confidence information for the age of the person. Wherein, the confidence information for the age of the person is obtained based on the first features extracted by the feature extraction unit 310 and the first classifier. At present disclosure, the first classifier is Super Vector Machine (SVM) classifier for example. Especially, in case the first features are extracted according to the CNN, the first classifier is Softmax classifier for example. In addition, since the second features are features which are obtained based on the corresponding confidence information, the dimensionality of the second features is much lower than the dimensionality of the first features extracted by the feature extraction unit 310. Thereby, the second features obtained by the feature obtainment unit 320 could be regarded as compact features or lightweight features for example.

Figure 5A:
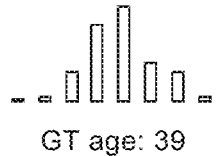
FIGS. 5A to 5B schematically shows exemplary pairs of GT age and corresponding confidence information according to the present invention.

In one implementation, the feature obtainment unit 320 obtains the second features as the following operations. Firstly, the feature obtainment unit 320 obtains the first classifier from the storage device 350. Secondly, the feature obtainment unit 320 determines the confidence information for the age of the person based on the first classifier and the first features extracted by the feature extraction unit 310. And then, the feature obtainment unit 320 regards the determined confidence information for the age of the person as the corresponding second features. Therefore, in this implementation, the pre-determined sample information stored in the storage device 350 comprises GT ages and confidence information for the GT ages (i.e. the corresponding features). As described above, the GT ages and the corresponding confidence information for the GT ages are stored in the form of pairs. For example, FIG. 5A shows an exemplary pair of a GT age (e.g. the GT age is 39 years old) and corresponding confidence information for this GT age.

In order to determine the more accurate sample information from the storage device 350, so that the more accurate age of the person could be recognized, except of the confidence information for the age of the person, confidence information for the other attributes of the person (e.g. the race of the person, the gender of the person) also could be used to determine the corresponding sample information. Therefore, in another implementation, the feature obtainment unit 320 obtains the second features with reference to FIG. 6.

Figure 6:
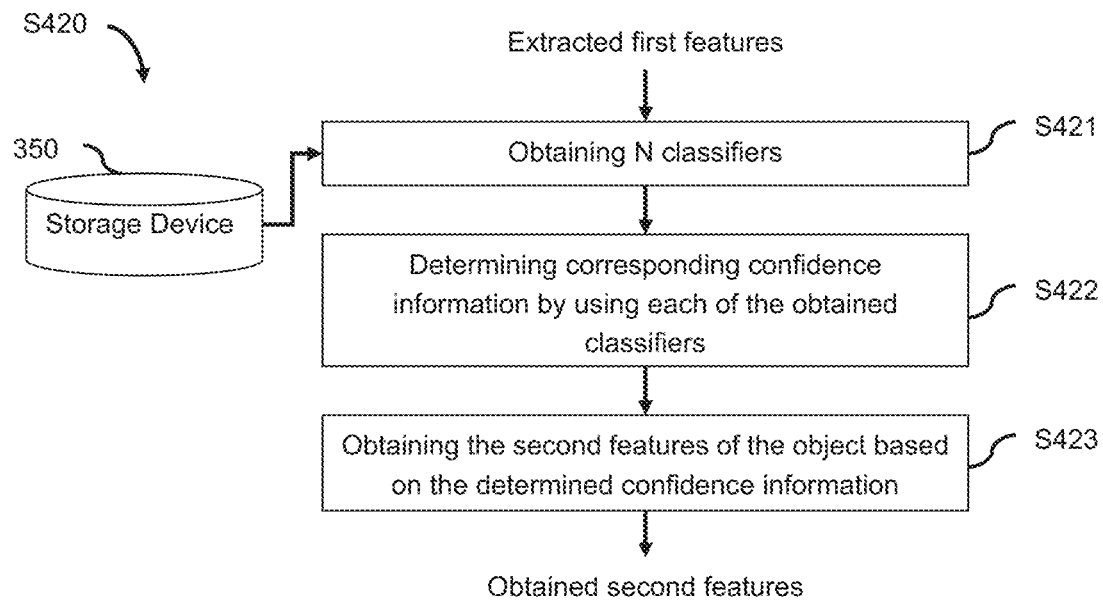
FIG. 6 schematically shows a flowchart of the step S420 as shown in FIG. 4 according to the present invention.

As shown in FIG. 6, in step S421, the feature obtainment unit 320 obtains N classifiers from the storage device 350. For example, in case the age of the person, the race of the person and the gender of the person will be used, the feature obtainment unit 320 will obtain three classifiers from the storage device 350. These three classifiers are the classifier which is used for classifying the age (i.e. the first classifier), the classifier which is used for classifying the race and the classifier which is used for classifying the gender.

In step S422, as for each attribute of the person, the feature obtainment unit 320 determines the corresponding confidence information for this attribute of the person based on the corresponding classifier and the first features extracted by the feature extraction unit 310. For example, in case the age of the person, the race of the person and the gender of the person will be used, the feature obtainment unit 320 will determine the confidence information for the age of the person, the confidence information for the race of the person and the confidence information for the gender of the person.

Figure 5B:
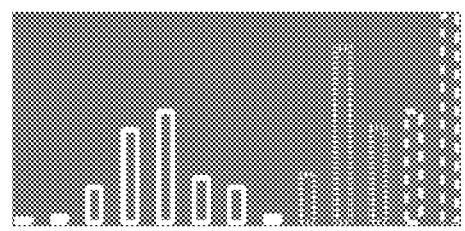
Figure 7:
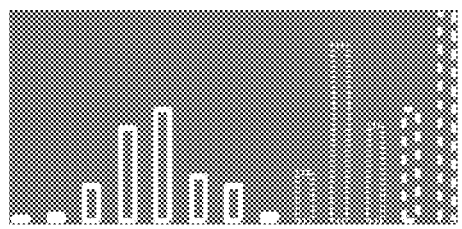
FIG. 7 schematically shows an exemplary concatenated confidence information which is obtained according to the flowchart shown in FIG. 6.

Then, in step S423, the feature obtainment unit 320 obtains the second features by grouping the confidence information for the corresponding attributes of the person which is determined in the step S422. In one implementation, the grouping operation is directly concatenating all of the confidence information determined in the step S422 together. In another implementation, the grouping operation is concatenating weighted confidence information together, wherein the weighted confidence information is obtained by weighting all of the confidence information determined in the step S422. In the other implementation, the grouping operation is merging all of the confidence information determined in the step S422 by using a projection method. That is to say, the grouped/concatenated/merged confidence information obtained by the feature obtainment unit 320 will be regarded as the corresponding second features. For example, in case the confidence information for the age of the person, the confidence information for the race of the person and the confidence information for the gender of the person are determined in the step S422, FIG. 7 shows an exemplary concatenated confidence information obtained by the feature obtainment unit 320, wherein, the bars with the solid lines represent the confidence information for the age of the person, the bars with the dash dot lines represent the confidence information for the race of the person, and the bars with the broken lines represent the confidence information for the gender of the person. Wherein, in this implementation, the pre-determined sample information stored in the storage device 350 comprises GT ages and confidence information (i.e. the corresponding features) which is obtained based on the confidence information for the GT ages and confidence information for the other human attributes. For example, as for one GT age, the corresponding confidence information is obtained by concatenating or merging the confidence information for this GT age and the confidence information for the other human attributes. As described above, the GT ages and the corresponding confidence information are also stored in the form of pairs. For example, FIG. 5B shows an exemplary pair of a GT age (e.g. the GT age is 39 years old) and corresponding concatenated confidence information, wherein, the bars with the solid lines represent the confidence information for the GT age, the bars with the dash dot lines represent the confidence information for the human race, and the bars with the broken lines represent the confidence information for the human gender.

Referring back to FIG. 4, after the second features are obtained from the received image in the feature obtainment step S420, in sample information determination step S430, the sample information determination unit 330 determines sample information from the pre-determined sample information stored in the storage device 350 based on the obtained second features.

In one implementation, the sample information determination unit 330 determines the sample information by matching the confidence information (i.e. the second features) obtained in the feature obtainment step S420 and the confidence information in the pre-determined sample information. More specifically, the matching operation is calculating similarity measures between the obtained confidence information and the confidence information in the pre-determined sample information, wherein, the similarity measures are measured by the distance metric, and the distance metric is for example Euclidean distance, Manhattan distance, L2-norm distance or L1-norm distance. For example, as for each pre-determined sample information stored in the storage device 350, in case the distance between the confidence information in this pre-determined sample information and the obtained confidence information is less than or equal to a pre-defined threshold (e.g. TH1), the GT age in this pre-determined sample information will be regarded as similar to the age of the person in the received image, therefore, this pre-determined sample information will be determined as one sample information.

Referring back to FIG. 4, after the sample information is determined in the sample information determination step S430, in attribute recognition step S440, the attribute recognition unit 340 recognizes the age of the person in the received image based on the GT ages in the determined sample information.

In one implementation, the age of the person in the received image recognized by the attribute recognition unit 340 is as follows: an average age which is obtained by averaging the GT ages in the determined sample information, a weighted age which is obtained by weighting the GT ages in the determined sample information, or one GT age in the determined sample information whose percentage is the largest among the determined sample information.

In another implementation, the attribute recognition unit 340 recognizes the age of the person in the received image as the following operations: firstly, determining an age distribution for the person in the received image based on the GT ages in the determined sample information by using a statistical method for example; and then, regarding a peak value or an expectation value which is determined based on the age distribution as the age of the person in the received image. In addition, in this implementation, the age distribution is determined by the attribute recognition unit 340. Alternatively, the age distribution also could be determined by other unit, such as a distribution determination unit (not shown in FIG. 3). In addition, the age distribution is at least represented as Heat Map, Histogram or Curve Graph. Alternatively, in this implementation, instead of recognizing the age of the person, a confidence interval of the age of the person in the received image could be recognized. Wherein, the detailed description will be described hereinafter according to the third embodiment of the present disclosure.

According to the first embodiment, since the pre-determined sample information is represented by the GT attributes (e.g. the GT ages) and the corresponding confidence information, and since the references (i.e. the sample information) which are used to recognize the attribute of the object are determined from this kind of pre-determined sample information, the accuracy of the attribute recognition will be improved and the speed of the attribute recognition will increase.

Figure 8:
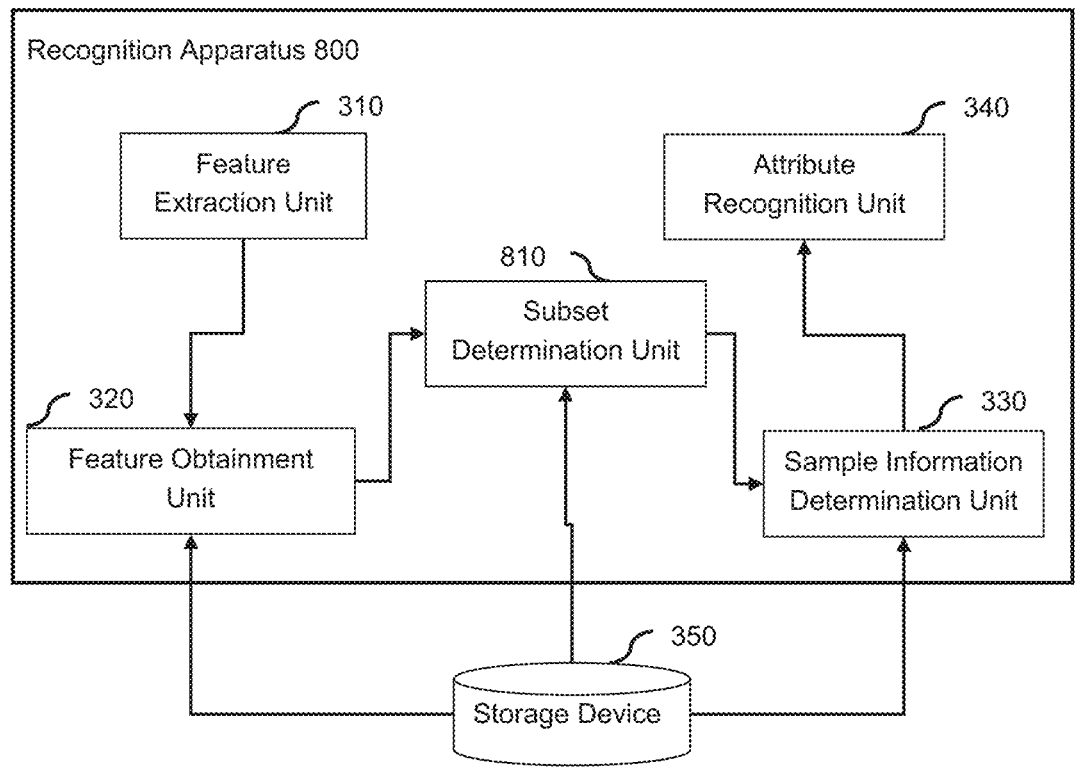
FIG. 8 is a block diagram illustrating the configuration of a recognition apparatus according to the second embodiment of the present invention.

As described in the first embodiment, there isn't any processing for the pre-determined sample information stored in the storage device 350. In order to further improve the speed of the attribute recognition, certain processing also could be executed on the pre-determined sample information stored in the storage device 350. FIG. 8 is a block diagram illustrating the configuration of the recognition apparatus 800 according to the second embodiment of the present disclosure. Wherein, some or all of the blocks shown in FIG. 8 could be implemented by dedicated hardware.

Comparing FIG. 8 with FIG. 3, the main difference of the recognition apparatus 800 shown in FIG. 8 is that the recognition apparatus 800 further comprises a subset determination unit 810.

More specifically, as shown in FIG. 8, before the sample information determination unit 330 determines the corresponding sample information, the subset determination unit 810 will firstly determine a subset from the pre-determined sample information stored in the storage device 350. And then, the sample information determination unit 330 will determine the sample information from the subset determined by the subset determination unit 810 according to the corresponding processing as described in the first embodiment. At this embodiment, recognizing the age of a person in an inputted image will still be taken as an example.

Figure 9:
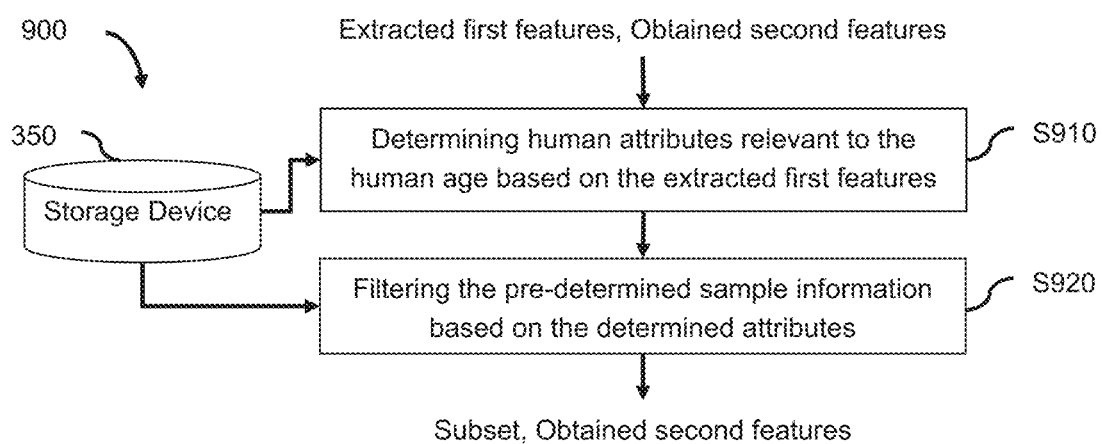
FIG. 9 schematically shows a flowchart of the subset determination unit 810 as shown in FIG. 8 according to the present invention.
Figure 10:
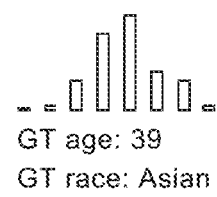
FIG. 10 schematically shows an exemplary pair of GT age, corresponding confidence information and GT human attribute relevant to the human age according to the present invention.

In one implementation, the subset determination unit 810 determines the corresponding subset with reference to the flowchart 900 shown in FIG. 9. Wherein, in this implementation, the pre-determined sample information stored in the storage device 350 comprises GT ages, confidence information for the GT ages and at least one GT human attribute relevant to the human age. As described above, the GT ages, the corresponding confidence information for the GT ages and the GT human attributes relevant to the human age are also stored in the form of pairs. Wherein, the human attributes relevant to the human age are the corresponding human attributes that will affect the recognition of the human age. For example, as for different races of the human, the recognition results for the human age will be different. As for different genders of the human, the recognition results for the human age will also be different. Therefore, as for the human age, the race of the human and/or the gender of the human could be regarded as the corresponding human attributes relevant to the human age. For example, in case the race of the human is regarded as the corresponding human attributes relevant to the human age, FIG. 10 shows an exemplary pair of a GT age (e.g. the GT age is 39 years old), the corresponding confidence information for this GT age and the GT race of the human (e.g. the GT race is Asian).

As shown in FIG. 9, taking regarding the race of the human as the corresponding human attribute relevant to the human age as an example, in step S910, the subset determination unit 810 obtains a second classifier which is used for determining the race from the storage device 350 and determines the race of the person (e.g. second attribute of the person) in the received image based on the second classifier and the first features extracted by the feature extraction unit 310.

Then, in step S920, the subset determination unit 810 filters the pre-determined sample information stored in the storage device 350 according to the determined race of the person in the received image. For example, the pre-determined sample information whose GT race is not the same as the determined race of the person in the received image will be filtered out. In other words, the pre-determined sample information whose GT race is the same as the determined race of the person in the received image will be remained and will be regarded as the corresponding subset.

In another implementation, the subset determination unit 810 determines the corresponding subset by selecting at least one cluster from the storage device 350.

In one aspect, in this implementation, the pre-determined sample information stored in the storage device 350 is clustered according to the GT ages in the pre-determined sample information by using a clustering method (e.g. Kmeans clustering algorithm) in advance. For example, the pre-determined sample information is clustered according to age intervals, such as 30 years old interval, 40 years old interval, 50 years old interval, and so on. Thereby, as for a cluster relevant to the 30 years old interval, all of the GT ages in the pre-determined sample information which is clustered in this cluster are within 30 years old. Therefore, in this implementation, the pre-determined sample information which is clustered in each cluster comprises GT ages, confidence information for the GT ages and a clustering centre of this cluster which is obtained during the clustering processing. As described above, the GT ages and the corresponding confidence information for the GT ages are also stored in the form of pairs.

In the other aspect, the subset determination unit 810 determines the corresponding subset as the following operations. Firstly, as for each cluster stored in the storage device 350, the subset determination unit 810 calculates the distance between the centre of this cluster and the second features obtained by the feature obtainment unit 320. Wherein, the distance is Euclidean distance, Manhattan distance, L2-norm distance or L1-norm distance for example. And then, the subset determination unit 810 selects at least one of the clusters according to the calculated distances and a pre-defined threshold (e.g. TH2). For example, as for each cluster, in case the calculated distance is less than or equal to the TH2, this cluster will be selected by the subset determination unit 810. Finally, the subset determination unit 810 regards all of the pre-determined sample information in these selected clusters as the corresponding subset.

In addition, since the feature extraction unit 310, the feature obtainment unit 320, the sample information determination unit 330, the attribute recognition unit 340 and the storage device 350 shown in FIG. 8 are the same as the corresponding units shown in FIG. 3, the detailed description would not be repeated herein.

According to the second embodiment, since the references (i.e. the sample information) which are used to recognize the attribute of the object are determined from the subset which has the smaller size, the speed of the attribute recognition will increase.

According to the recognition apparatus 300 shown in FIG. 3 and the recognition apparatus 800 shown in FIG. 8, the present disclosure is used to recognize the attribute of the object in one image. While, the present disclosure also could be used to recognize the attribute of the object in a video. FIG. 11 is a block diagram illustrating the configuration of the recognition apparatus 1100 according to the third embodiment of the present disclosure. Wherein, some or all of the blocks shown in FIG. 11 could be implemented by dedicated hardware.

Comparing FIG. 11 with FIG. 3, the main difference of the recognition apparatus 1100 shown in FIG. 11 is that the recognition apparatus 1100 further comprises an image obtainment unit 1110, a distribution determination unit 1120 and a recognition unit 1130.

At this embodiment, recognizing the age of a person (e.g. first attribute of the person) in an inputted video will still be taken as an example. However, it is readily apparent that it is not necessarily limited thereto. First, the Input Device 250 shown in FIG. 2 receives a video which is output from the special electronic device (e.g. the camera) or is input by the user. Second, the Input Device 250 transfers the received video to the recognition apparatus 1100 via the system bus 280.

And then, as shown in FIG. 11, the image obtainment unit 1110 obtains at least one image from the received video. For example, each video frame in the received video is obtained by the image obtainment unit 1110.

As for each image (i.e. each video frame) obtained by the image obtainment unit 1110, the feature extraction unit 310, the feature obtainment unit 320, the sample information determination unit 330 execute the corresponding operations on this image according to the above-mentioned first embodiment. Since the corresponding operations are the same as the corresponding operations as described in the above-mentioned first embodiment, the detailed description would not be repeated herein.

Figure 12A:
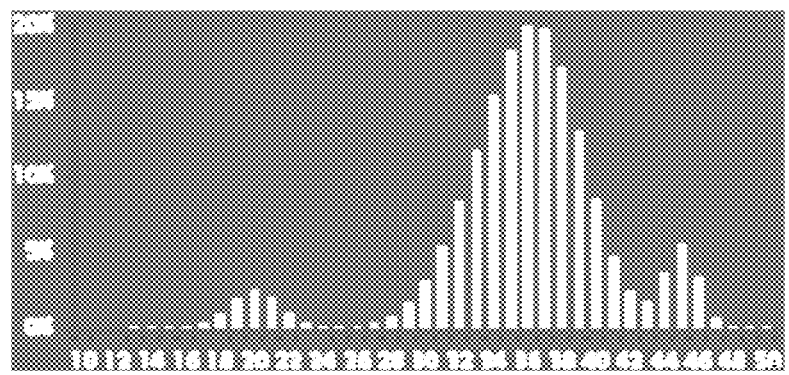
FIGS. 12A to 12C schematically shows exemplary age distributions determined according to the third embodiment of the present invention.
Figure 12B:
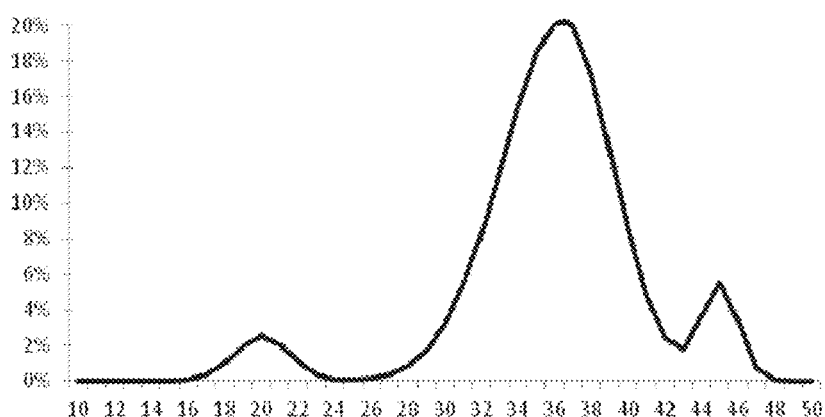
Figure 12C:
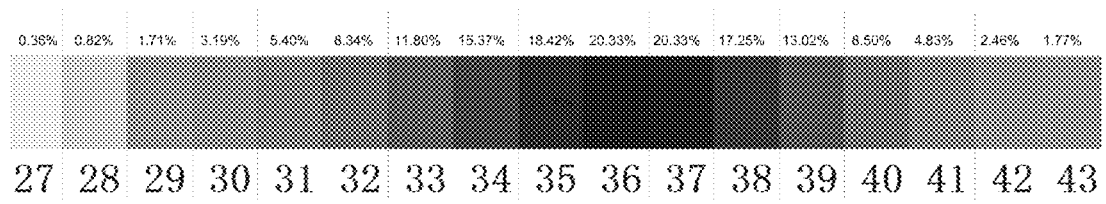

Then, after the sample information determination unit 330 determines the corresponding sample information for each image, the distribution determination unit 1120 determines an age distribution for the person in the received video based on the GT ages in all of the determined sample information by using a statistical method for example. In one implementation, the determined age distribution is represented as a Histogram, such as the Histogram shown in FIG. 12A. As shown in FIG. 12A, for example, the X-coordinate is used to denote values of the GT ages and the Y-coordinate is used to denote percentages of the GT ages. In another implementation, the determined age distribution is represented as a Curve Graph, such as the Curve Graph shown in FIG. 12B. As shown in FIG. 12B, for example, the X-coordinate is also used to denote values of the GT ages and the Y-coordinate is also used to denote percentages of the GT ages. In the other implementation, in order to enable the user to intuitionally see the age distribution for the person in the received video and in order to make sure that the displaying space in the Output Device 260 shown in FIG. 2 which is used to display the age distribution to the user is as small as possible, the determined age distribution is represented as a Heat Map, such as the Heat Map shown in FIG. 12C. As shown in FIG. 12C, for example, each block is used to denote values of the GT ages and the deepness of each block is used to percentages of the GT ages, wherein, the percentage of one GT age is higher, the deepness of the corresponding block in the Heat Map is deeper. Finally, after the distribution determination unit 1120 determines the age distribution, the distribution determination unit 1120 transfers the age distribution to the Output Device 260 shown in FIG. 2 via the system bus 280 for displaying the age distribution to the user or for the subsequent processing, such as human behaviour analysis (e.g. people attribute counting, people tracking, crowd analysis), face identification, human image search, and so on.

Furthermore, according to the above-mentioned second embodiment, in order to further improve the speed of the attribute recognition, the recognition apparatus 1100 as shown in FIG. 11 further could comprise a subset determination unit (not shown in FIG. 11). And as for each image obtained by the image obtainment unit 1110, the feature extraction unit 310, the feature obtainment unit 320, the subset determination unit (e.g. the subset determination unit 810 shown in FIG. 8), the sample information determination unit 330 execute the corresponding operations on this image according to the above-mentioned second embodiment. Since the corresponding operations are the same as the corresponding operations as described in the above-mentioned second embodiment, the detailed description is not be repeated herein.

In addition, in one application, the age distribution for the person in the received video is used to determine the age of the person in the received video. Therefore, as shown in FIG. 11, after the age distribution is determined by the distribution determination unit 1120, the recognition unit 1130 recognizes the age of the person in the received video based on the age distribution. For example, the peak value or the expectation value which is determined based on the age distribution will be regarded as the age of the person in the received video. Alternatively, the age of the person in the received video also could be determined as follows but not according to the above-mentioned application. Firstly, each video frame is obtained from the received video. Then, as for each video frame, the age of the person in this video frame is recognized according to the above-mentioned first embodiment or according to the above-mentioned second embodiment. Finally, the age of the person in the received video is determined based on the age of the person in each video frame. For example, the age of the person in the received video is as follows: an average age which is obtained by averaging the ages of the person in all of the video frames, a weighted age which is obtained by weighting the ages of the person in all of the video frames, or one age whose percentage is the largest among the ages of the person in all of the video frames.

In another application, the age distribution for the person in the received video is used to determine a confidence interval of the age of the person in the received video. Therefore, as shown in FIG. 11, after the age distribution is determined by the distribution determination unit 1120, the recognition unit 1130 recognizes the confidence interval of the age of the person in the received video based on the age distribution. For example, the corresponding confidence interval is represented by the following formula (1):

$$\text{Confidence interval} = (X - Y_1, X + Y_2) \qquad (1)$$

wherein, X is the expectation value which is determined based on the age distribution, $Y_1$ is the left confidence which occupies α % of the age distribution, and $Y_2$ is the right confidence which occupies β % of the age distribution. In addition, α and β could be set as with a same value or different values.

Furthermore, in the other application, the age distribution for each person in the received video or the age of each person in the received video could be used in human behaviour analysis for example. Firstly, as for each person in the received video, the age distribution for this person or the age of this person will be determined according to the above-mentioned third embodiment. And then, an age distribution for all of the persons in the received video will be determined based on the determined age distributions for all of the persons or based on the determined ages of all of the persons by using a statistical method for example. Then, based on the age distribution for all of the persons in the received video, the corresponding processing for human behaviour analysis could be executed.

All of the units described above are exemplary and/or preferable modules for implementing the processes described in the present disclosure. These units can be hardware units (such as a Field Programmable Gate Array (FPGA), a digital signal processor, an application specific integrated circuit or the like) and/or software modules (such as computer readable program). The units for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the disclosure of the present application, as long as the technical solutions they constitute are complete and applicable.

It is possible to carry out the method and apparatus of the present invention in many ways. For example, it is possible to carry out the method and apparatus of the present invention through software, hardware, firmware or any combination thereof. The above described order of the steps for the method is only intended to be illustrative, and the steps of the method of the present invention are not limited to the above specifically described order unless otherwise specifically stated. Besides, in some embodiments, the present invention may also be embodied as programs recorded in recording medium, including machine-readable instructions for implementing the method according to the present invention. Thus, the present invention also covers the recording medium which stores the program for implementing the method according to the present invention.

Although some specific embodiments of the present invention have been demonstrated in detail with examples, it should be understood by a person skilled in the art that the above examples are only intended to be illustrative but not to limit the scope of the present invention. It should be understood by a person skilled in the art that the above embodiments can be modified without departing from the scope and spirit of the present invention. The scope of the present invention is defined by the attached claims.

What is claimed is:

1. A recognition apparatus, comprising:
one or more processors; and
at least one memory coupled to the one or more processors, the at least one memory having stored thereon instructions which, when executed by the one or more processors, cause the apparatus to:
extract image features of an object from a region of the object which is obtained from an image;
obtain confidence information for a first attribute of the object based on the extracted image features and a classifier for the first attribute;
obtain a second feature by merging a plurality of obtained confidence information that the object belongs to each value or class for each attribute;
determine sample information by matching the second feature with a confidence information contained in pre-determined sample information, wherein the pre-determined sample information contains the confidence information of the first attribute and Ground Truth (GT) of the first attribute for each registered image; and
recognize, based on a GT contained in the determined sample information, the first attribute of the object included in the image.

2. The apparatus according to claim 1, wherein the first attribute is age of human and a second attribute is human's attribute except the age;
and each of the samples contains GT of the age, GT of the second attribute, the confidence information for the first attribute and a confidence information for the second attribute.

3. The apparatus according to claim 1, wherein the image features are extracted according to convolutional neural network.

4. The apparatus according to claim 2, wherein the instructions, when executed by the one or more processors, further cause the apparatus to:
determine the second attribute using a classifier for the second attribute;
wherein, the each of the samples is determined by using the determined second attribute.

5. The apparatus according to claim 4, wherein the each of the samples is determined by filtering the samples with the second attribute.

6. The apparatus according to claim 4, wherein the second attribute is determined by selecting at least one cluster which are obtained by clustering the samples.

7. The apparatus according to claim 1, wherein the object is human, wherein the first attribute and a second attribute of the object are facial attributes of the human or body attributes of the human.

8. A method of controlling a computer to function as the recognition apparatus according to claim 1.

9. A non-transitory computer-readable storage medium storing a program which, when executed by a computer, causes the computer to function as the recognition apparatus according to claim 1.

10. The apparatus according to claim 1, wherein the determined sample information is determined by calculating a similarity measure between the confidence information with the image and the confidence information in the predetermined sample information.

* * * * *